H. FOUASSE.
APPARATUS FOR ENGAGING AND FASTENING PLATE HOLDER FRAMES AND FILM HOLDERS ON THE BODY OF PHOTOGRAPHIC APPARATUS.
APPLICATION FILED APR. 16, 1919.
1,370,529.
Patented Mar. 8, 1921.
2 SHEETS—SHEET 1.
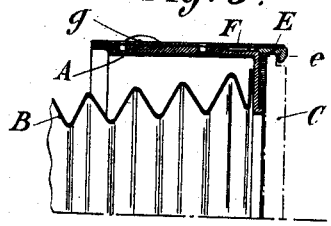
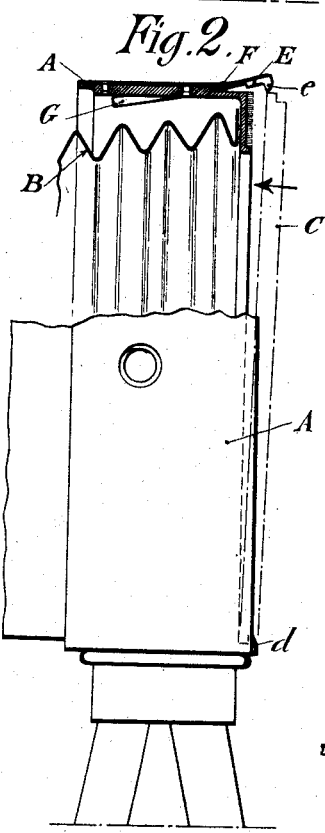
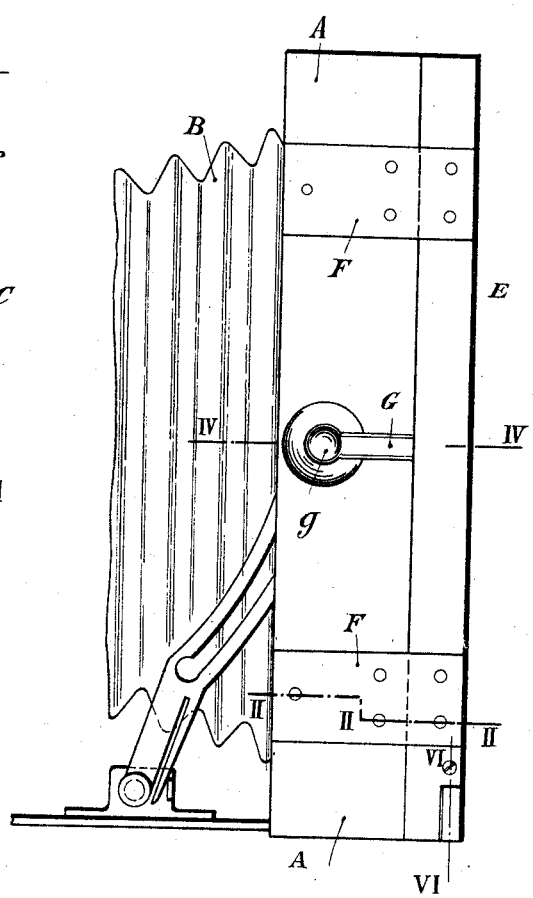
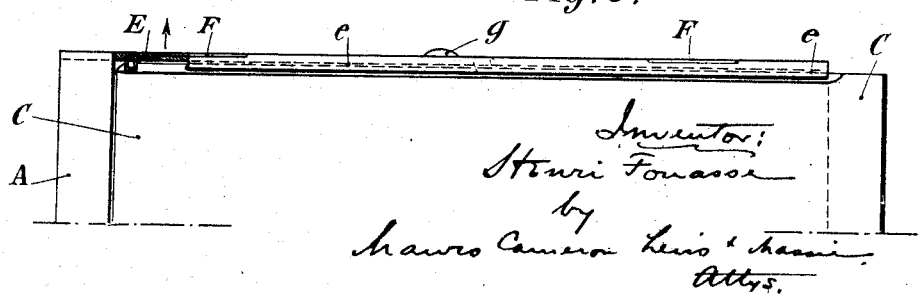

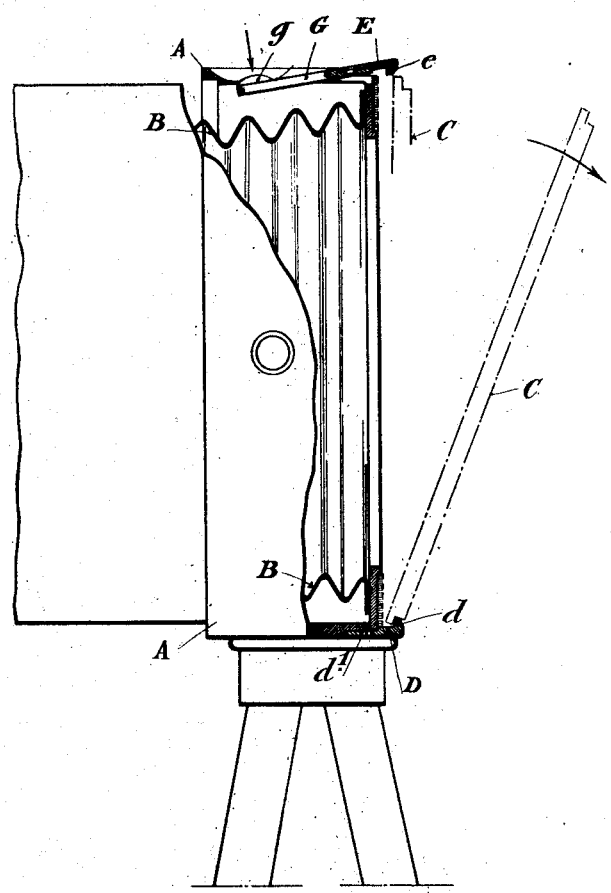
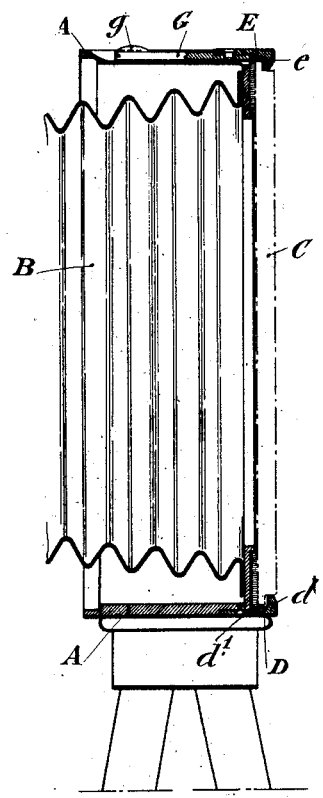

UNITED STATES PATENT OFFICE.

HENRI FOUASSE, OF PARIS, FRANCE, ASSIGNOR TO SOCIETE D'OPTIQUE ET DE MECANIQUE DE HAUTE PRECISION, OF PARIS, FRANCE, A JOINT-STOCK COMPANY OF FRANCE.

APPARATUS FOR ENGAGING AND FASTENING PLATE-HOLDER FRAMES AND FILM-HOLDERS ON THE BODY OF PHOTOGRAPHIC APPARATUS.

1,370,529.  Specification of Letters Patent.  Patented Mar. 8, 1921.

Application filed April 16, 1919. Serial No. 290,587.

*To all whom it may concern:*

Be it known that I, HENRI FOUASSE, citizen of the French Republic, and resident of 125 Boulevard Davout, Paris, France, have invented a new and useful Improvement in Apparatus for Engaging and Fastening Plate-Holder Frames and Film-Holders on the Body of Photographic Apparatus, which invention is fully set forth in the following specification.

As is well known, photographic apparatus comprises, for the purpose of forming the dark chamber, a body whose rear portion, which may be fixed, or may be movable with the carriage, is connected by a bellows to the movable or fixed forward portion carrying the objective. This rear portion or body is provided on two sides with grooves or slideways formed in one piece therewith or attached thereto, serving for engaging and holding successively a frame bearing a ground glass plate for focusing, and plate-holder frames, magazine frames or film-pack frames.

In the apparatus heretofore used, when they are mounted on a portable stand, it generally happens that the effort necessary for placing the plate-carrying frame into the grooves of the body of the apparatus, shakes the stand and spoils the focusing.

The present invention has for its object to provide an improved means for engaging the plate-holder frames upon the body of the apparatus in such a manner as to remedy the above mentioned drawback.

According to this invention the slideways for the engagement of the frame, or at least one of said slideways, instead of being formed by a rimmed bar that is rigidly fixed to or formed in one piece with the body of the apparatus, are or is constituted by a catch-bar movably jointed to the said body by spring hinges; the springs having a constant tendency to maintain the catch-bar in its normal engaging position but allowing it to move aside by the action of a pressure exerted upon the rim. The placing of the plate-frame into position is effected in this method of construction, by means of the spring-pressed catch-bar, the frame being brought opposite to the body-part of the apparatus and engaged at once by said catch-bar without longitudinal displacement along the latter.

The spring pressed catch-bar may be provided at a suitable point with a lever fitted with a bearing knob or any other equivalent part, by the operation of which the said bar can be moved aside for the purpose of withdrawing the frame. In this manner the said withdrawal can be effected like the engaging, without longitudinal movement of the frame in the grooves.

A constructional form of this invention is illustrated by way of example in the accompanying drawings.

Figure 1 is a plan of the rear body of a photographic apparatus provided with this invention.

Fig. 2 is a vertical section on the line II—II of Fig. 1 illustrating the moving aside of the hinged catch-bar for the purpose of inserting or removing a plate-frame.

Fig. 3 is a partial section on the same line showing the jointed bar in its normal position.

Figs. 4 and 5 are vertical sections on the line IV—IV of Fig. 1, that is to say, along the axis of the small lever for operating the jointed bar, the said lever being shown respectively in its position of rest and in its depressed position.

Fig. 6 is a partial front elevation showing the frame engaged and fastened, a portion of the view being broken off in section on the line VI—VI of Fig. 1.

In these several figures, A is the rectangular casing or rear body-part of an apparatus connected in the usual manner by a bellows B to the front body (not shown) that carries the objective.

The rear body-part A is formed with grooves or slideways for the engagement of the closure or plate-carrying frame C.

In the apparatus hitherto employed, both these slideways are formed like the one shown in the lower part of the rear body-part A in Figs. 4 and 5, between the said body and a bar D provided with a rim $d$, the said bar being rigidly fixed to the body A by rivets or screws $d^1$.

According to this invention one of the slideways, or it may be both, is or are formed as shown in the drawings, by a catch-bar E provided with a detent flange, lip or rim $e$, the said bar being movably jointed to the body-part A by a spring hinge. In the example shown, the spring hinge is constituted very simply by spring strips F riveted at one end to the body-part A, and at their other ends to the bar E. The elasticity of the strips has a constant tendency to maintain them in the normal position shown in Figs. 3 and 6.

For the purpose of fastening a plate-frame, it is sufficient to engage the lower longitudinal edge of the said frame behind the rim or hook $d$ of the lower slideway; then to apply a slight pressure near the upper edge in such a manner as to cause the rim $e$ of the spring-pressed catch-bar to move aside (Fig. 2). This catch-bar returns immediately afterward into its normal position and engages the top of the plate-frame (Figs. 3 and 6).

A lever or lever arm G provided at its free end with a knob $g$, is fixed at a suitable point of the catch-bar E and occupies normally the position shown in Figs. 1 and 4. By pressing upon the knob $g$ in such a manner as to move the lever into the position shown in Fig. 5, the frame C is allowed to tilt so as to allow of its withdrawal.

It is to be understood that the body-part A is suitably notched to receive the lever G and allow the latter to move.

What I claim is:—

1. In combination, a frame or casing of a photographic camera said casing having an opening; a closure member adapted to close said opening; means for holding said closure member in its closing position to said opening said means including a detent member having a flange or lip adapted to engage one edge of the closure member for approximately the entire length of its said edge in holding the closure member in its closing position; means movably attaching said detent member to the frame whereby it may be moved outward while still attached to the frame to a position to clear its engagement with the edge of the closure member and thereby permit the latter to be moved at its said edge away from the frame in contradistinction to disengagement by a longitudinal sliding movement of the closure member; and tension means normally holding said detent member in position to engage the edge of said closure member but yielding to movement of said detent means in displacing the same to clear the edge of the closure member.

2. In combination, a frame or casing of a photographic camera; a catch-bar extending along the edge of said frame at one side thereof and having thereon an inwardly projecting detent flange or lip; means attaching said catch-bar to the frame to swing on an axis parallel thereto; and a lever arm attached to said catch-bar with the outer end of said arm on the opposite side of said axis to that at which the flanged edge of the catch-bar is located, whereby pressure upon said lever arm in one direction turns the catch-bar to move its flanged edge in the opposite direction.

3. In combination, a frame or casing of a photographic camera; a catch-bar extending along the edge of said frame at one side thereof and having thereon an inwardly projecting detent flange or lip; tension means attaching said catch-bar to the frame but yielding to permit said bar to swing outward at its flanged edge about an axis parallel to the bar; and a lever arm attached to said catch-bar with the outer end of said arm on the opposite side of said axis to that at which the flanged edge of the bar is located, whereby pressure upon said lever arm in one direction turns the catch-bar against the tension of said tension means to move its flanged edge in the opposite direction.

4. In combination, a frame or casing of a photographic camera said casing having an opening; a closure member adapted to close said opening; means for holding said closure member in its closing position to said opening said means including a detent member having a flange or lip adapted to engage one edge of the closure member for approximately the entire length of its said edge in holding the closure member in its closing position; means movably attaching said detent member to the frame whereby it may be moved outward while still attached to the frame to a position to clear its engagement with the edge of the closure member and thereby permit the latter to be moved at its said edge away from the frame in contradistinction to disengagement by a longitudinal sliding movement of the closure member; tension means normally holding said detent member in position to engage the edge of said closure member but yielding to movement of said detent means in displacing the same to clear the edge of the closure member; and a lever arm for actuating said detent to its release position.

5. In a device of the character described, a photographic camera casing having an opening and a recess in its wall, a closure for said opening, means at one side of the casing to engage one edge of the closure, a catch-bar extending along the other side of the casing to engage the other edge of the closure, separated spring-plates overlapping and secured to the casing and catch-bar to form a spring-joint between said members, said spring-plates normally pressing the catch-bar into engagement with the closure and permitting the catch-bar to be raised to allow the edges of the closure to pass clear of the catch, and a lever fixed on the catch-bar between the spring-plates and depressible in the aforesaid recess in the casing wall for raising the catch-bar against the action of the spring-plates.

6. In combination, a frame or casing of a photographic camera having an opening and a recess in its wall; a closure member adapted to close said opening; means for holding said closure member in its closing position to said opening said means including a catch-bar extending along one side of the frame and having a flange or lip adapted to engage one edge of the closure member in holding the same in its closing position; means attaching said catch-bar to the frame permitting the bar to swing outward at its flanged edge about an axis longitudinal thereof to disengage it from the edge of the closure member; and a lever arm on said catch-bar positioned in the aforesaid recess of the wall of the frame and adapted upon being pressed inward to swing said catch-bar outward about its axis to position to release the closure member.

7. In combination, the frame or casing of a photographic camera having an opening and a recess in its wall; a closure member adapted to close said opening; means for holding said closure member in its closing position to said opening said means including a catch-bar extending along one side of the frame and having a flange or lip adapted to engage one edge of the closure member in holding the same in its closing position; means attaching said catch-bar to the frame permitting the bar to swing outward at its flanged edge about an axis longitudinal thereof to disengage it from the edge of the closure member; a lever arm on said catch-bar positioned in the aforesaid recess of the wall of the frame and adapted upon being pressed inward to swing said catch-bar outward about said axis to position to release the closure member; and tension means tending to hold said catch-bar in its non-release position.

In testimony whereof I have signed this specification.

HENRI FOUASSE.